United States Patent
Christmas et al.

(10) Patent No.: US 12,372,922 B2
(45) Date of Patent: Jul. 29, 2025

(54) DISPLAY DEVICE AND METHOD

(71) Applicant: Envisics Ltd, Milton Keynes (GB)

(72) Inventors: Jamieson Christmas, Milton Keynes (GB); Mark Newsam, Milton Keynes (GB); Ian Bledowski, Milton Keynes (GB); Roderick Oldfield, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 10 days.

(21) Appl. No.: 18/259,182

(22) PCT Filed: Mar. 8, 2022

(86) PCT No.: PCT/EP2022/055855
§ 371 (c)(1),
(2) Date: Jun. 23, 2023

(87) PCT Pub. No.: WO2022/194613
PCT Pub. Date: Sep. 22, 2022

(65) Prior Publication Data
US 2024/0077833 A1    Mar. 7, 2024

(30) Foreign Application Priority Data

Mar. 15, 2021   (GB) ...................................... 2103538

(51) Int. Cl.
*G03H 1/22*   (2006.01)
*G03H 1/00*   (2006.01)
(Continued)

(52) U.S. Cl.
CPC ............ *G03H 1/0005* (2013.01); *G03H 1/02* (2013.01); *G03H 1/2645* (2013.01);
(Continued)

(58) Field of Classification Search
CPC ...... G03H 1/0005; G03H 1/02; G03H 1/2645; G03H 2001/0088; G03H 2001/0224;
(Continued)

(56) References Cited

U.S. PATENT DOCUMENTS

2006/0098156 A1* 5/2006 Frisken .............. G01M 11/0292
349/193
2009/0244109 A1* 10/2009 Chen .................... G09G 3/3648
345/87

(Continued)

OTHER PUBLICATIONS

Joel Carpenter et al.; Computation of high-stability DC balancing scheme for ferroelectric liquid crystal on silicon holograms using graphics processing units; Optics Letters; Apr. 15, 2011; 1323-1325, vol. 36, No. 8; Optical Society of America; US; ISSN: 0146-9592.

(Continued)

*Primary Examiner* — Howard D Brown, Jr.
(74) *Attorney, Agent, or Firm* — McDonnell Boehnen Hulbert & Berghoff LLP

(57) ABSTRACT

A liquid crystal display device and corresponding method to display a hologram is described. A grey level value for each pixel of a hologram is received and a pixel voltage based on grey level for each pixel of the hologram is determined. The pixels of the display device are driven in accordance with a first representation of the pixel voltages during at least one first drive event. The pixels of the display device are driven in accordance a second representation of the pixel voltages during at least one second drive event after the at least one first drive event. The first representation may be an n-bit representation and the second representation may be a m-bit representation and n<m. The at least one first drive event may be shorter in duration than the at least one second drive event.

20 Claims, 11 Drawing Sheets

(51) Int. Cl.
*G03H 1/02* (2006.01)
*G03H 1/26* (2006.01)

(52) U.S. Cl.
CPC ............... *G03H 2001/0088* (2013.01); *G03H 2001/0224* (2013.01); *G03H 2001/2655* (2013.01); *G03H 2225/12* (2013.01); *G03H 2225/22* (2013.01)

(58) Field of Classification Search
CPC ....... G03H 2001/2655; G03H 2225/12; G03H 2225/22; G03H 1/2294; G03H 2001/2297; G03H 1/26
See application file for complete search history.

(56) References Cited

U.S. PATENT DOCUMENTS

| | | | |
|---|---|---|---|
| 2020/0150590 A1* | 5/2020 | Christmas | G03H 1/0005 |
| 2020/0159102 A1* | 5/2020 | Kouyama | G02F 1/0123 |
| 2024/0393743 A1* | 11/2024 | Brooker | G02B 21/361 |

OTHER PUBLICATIONS

Combined Search and Examination Report in United Kingdom, Patent Application No. GB2103538.1, dated Nov. 24, 2021.
International Search Report, International Application No. PCT/EP2022/055855, dated Mar. 8, 2022.

* cited by examiner

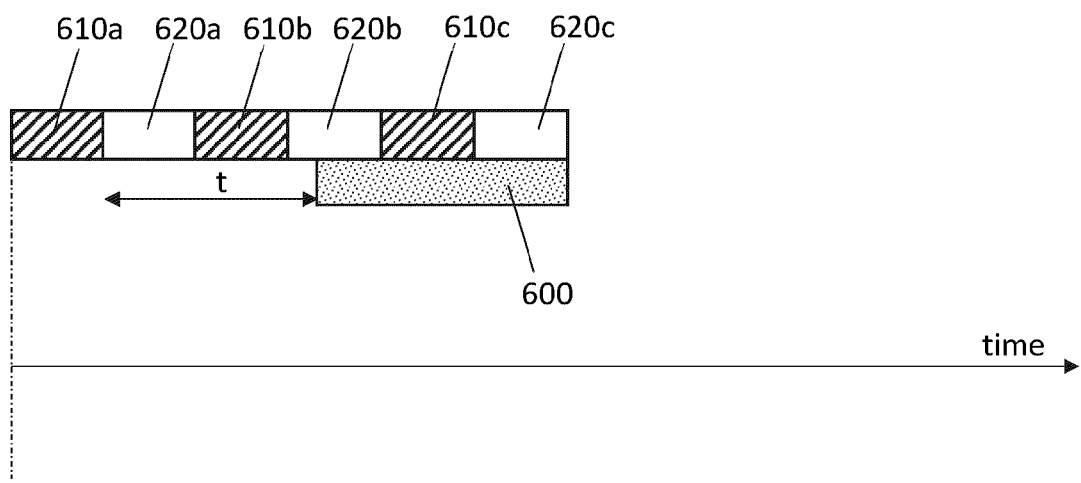
FIGURE 6A – COMPARATIVE EXAMPLE

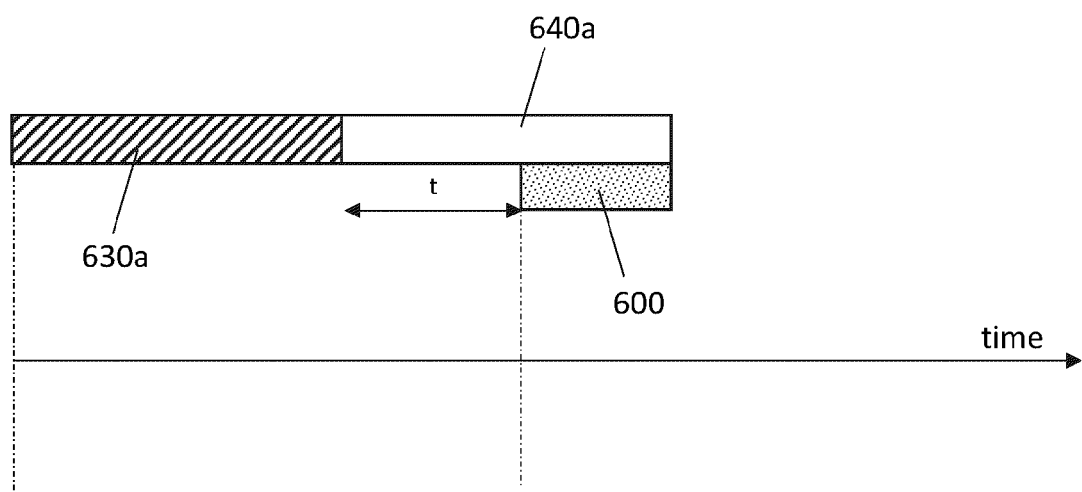
FIGURE 6B - COMPARATIVE EXAMPLE

DISPLAY DEVICE AND METHOD

CROSS-REFERENCE TO RELATED APPLICATIONS

The present application is a U.S. National Stage application of International Patent Application no. PCT/EP2022/055855, filed Mar. 8, 2022, which claims the benefit of priority of United Kingdom Patent Application no. 2103538.1, filed Mar. 15, 2021.

FIELD

The present disclosure relates to a display device. More specifically, the present disclosure relates to a display device to display a hologram, a method of driving a display device to display a hologram and a holographic projection system. Some embodiments relate to a head-up display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and head-mounted displays, "HMD", including near-eye devices, for example.

A moving diffuser may be used to improve image quality in devices which use coherent light such as holographic projectors.

SUMMARY

Aspects of the present disclosure are defined in the appended independent claims.

There is disclosed herein a method of driving a liquid crystal display device to display a hologram. The method comprises a first step of receiving a grey level value for each pixel of a hologram. The method comprises a second step of determining a pixel voltage based on grey level for each pixel of the hologram. Each pixel voltage value may be determined from the corresponding grey level value using a predetermined calibration scheme. The method comprises a third step of driving the pixels of an array of pixels of the liquid crystal display device in accordance with a first representation of the pixel voltages during at least one first display event. The third step further comprises driving the pixels of the array of pixels of the liquid crystal display device in accordance with a second representation of the pixel voltages during at least one second drive event. The at least one second drive event is after the at least one first drive event. That is, the at least one second drive event occurs later in time than the at least one first drive event. In an embodiment disclosed herein, the first representation is an n-bit representation. That is, each pixel voltage in accordance with the first representation is an n-bit number. The second representation is an m-bit representation, wherein n<m. That is, each pixel voltage in accordance with the second representation is an m-bit number.

In accordance with the present disclosure, holograms are displayed on a display device, in particular a liquid crystal display device. The display device comprises a plurality of pixels such as a 2D array of pixels. Each hologram is represented by a plurality of hologram pixel values such as a 2D array of hologram pixel values. Each hologram pixel value may be a grey level that is converted into a pixel drive voltage in accordance with a calibration of the display device. Each hologram is displayed on the display device by providing each pixel of the 2D array of pixels of the display device with a drive voltage corresponding to a respective hologram pixel value. The process by which all pixels of the display device used to display the hologram are provided with a drive voltage is referred to herein as a drive event. Each drive event may be considered a complete drive event because a respective pixel voltage is written to all pixels of the 2D array of pixels of the display device during the event. Thus, a drive event is also referred to herein as a display event.

The method disclosed herein uses at least one crude (first) display event before illumination of the pixels to form a holographic reconstruction. During the at least one crude (first) display event, the liquid crystals of each pixel are at least set in motion by rapid transmission (rapid writing) of low bit-depth numbers representative of the pixel voltages to the display device. A low bit-depth number is a number comprising a relatively small number of bits such as 6 or 8-bits. In may be said that the short display events using low bit-depth numbers provide crude (or coarse) alignment of the liquid crystals in accordance with the hologram. This stage is followed by fine-tuning the orientation of the liquid crystals using higher bit-depth numbers representative of the pixel voltages. A higher bit-depth number is a number having more bits that the low bit-depth number such as 10 or 12-bits. A technical advancement provided by this method is that all pixels of the 2D array of pixels of the display device receive a drive voltage (albeit a low bit-depth drive voltage) in accordance with the hologram sooner than if all drive events used the higher bit-depth numbers. It is found that the liquid crystals of the pixels each reach their final state sooner owing to the at least one crude (first) drive event. It may alternatively be said that the method of the present disclosure allows higher bit-depth numbers to be used to represent the pixel voltages without adversely affecting the time it takes before holographic reconstruction can begin.

Accordingly, the proposed display drive method comprises a plurality of display events, which together correspond to the display of a display frame (i.e. the hologram). Thus, for the display of a video images, the duration of the plurality of display events may correspond to a desired frame rate. In some embodiments, at least one (first) drive event is completed (for each frame) during the display ramp-up stage before illumination begins otherwise some pixels of the display device may not be in the correct state and the quality of the holographic reconstruction may suffer. In some embodiments, a time delay is provided between completion of the very first drive event (in time) of the plurality of drive events in order to allow the liquid crystal of each pixel to reach its final state.

The at least one first drive event is shorter in duration than the at least one second drive event because n<m. The time taken to transmit a data set is proportional to the number of bits of each data value/number of the data set. Accordingly, the at least one first display event is shorter (in time) than the at least second display event.

In some embodiments, each first drive event comprises addressing each pixel of the liquid crystal display device for a first maximum number of clock counts and ramping-up the voltage across each pixel for a number of clock counts corresponding to the first representation of the respective pixel voltage. The first maximum number of clock counts corresponds to the maximum pixel voltage in accordance with the first representation. Each second drive event comprises addressing each pixel of the liquid crystal display device for a second maximum number of clock counts and ramping-up the voltage across each pixel for a number of clock counts corresponding to the second representation of the respective pixel voltage. The second maximum number of clock counts corresponds to the maximum pixel voltage in accordance with the second representation. The first maximum number of clock pulses is less than the second maximum number of clock pulses.

In these embodiments, during a drive event, each pixel of the liquid crystal display device is addressed for an addressing period having a duration corresponding to a maximum number of clock pulses. During the addressing period, the pixel is driven by a ramp voltage across the pixel for a ramping period having a duration defined by a number of clock pulses corresponding to the desired pixel voltage, up to the maximum number of clock pulses corresponding to the maximum pixel voltage. Thus, the addressing period for each pixel during the first display events is shorter (in time) than the addressing period for each pixel during the second display events. In addition, when used together with low bit-depth drive voltages for the first display events, the ramping period for each pixel is shorter (in time) for the first display events than the second display events. Reducing the addressing and/or ramping period for the pixels leads to more rapid pixel driving.

In the following description, the term "frame" refers to one image of a sequence of video-rate images. The frame rate is typically 60 Hz which means that the duration of one frame is 16 ms. The next "frame" corresponds to the next image of the video sequence. Thus, a "frame interval" of 16 ms corresponds to the time period in which to write the pixel voltages and form the holographic reconstruction corresponding to the input image before the next frame must be processed.

In the present description, the term "drive event" refers to transmitting or writing a pixel voltage to all pixels of the display device. In this context, "all pixels" refers to all pixels of a 2D array of pixels of the display device that are encoded in order to display a light modulation distribution comprising a hologram. As the skilled person will appreciate, every pixel of the 2D array of pixels is addressed during each drive event to display a hologram thereon. Accordingly, the term "all addressable pixels" is also used herein to refer to the 2D array of pixels that are encoded in order to display a particular hologram. Thus, the duration of a drive event is the shortest time in which a pixel voltage is written to all (addressable) pixels of the display device. As described herein, the frame interval comprises a plurality of drive events. There may be 10-20 drive events in relation to each frame. It may be said that each drive event writes a "sub-frame" to the display device in a "sub-frame interval" (i.e. the duration of the drive event). The frame interval is typically fixed according to the frame rate. In accordance with the present disclosure, the sub-frame interval (and thus the sub-frame rate) may be varied for sub-frames of a given frame.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values (or pixel voltages) which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures:

FIG. 6A shows an example scheme for driving a display device to display a hologram frame;

FIG. 6B another example scheme for driving a display device to display a hologram frame;

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
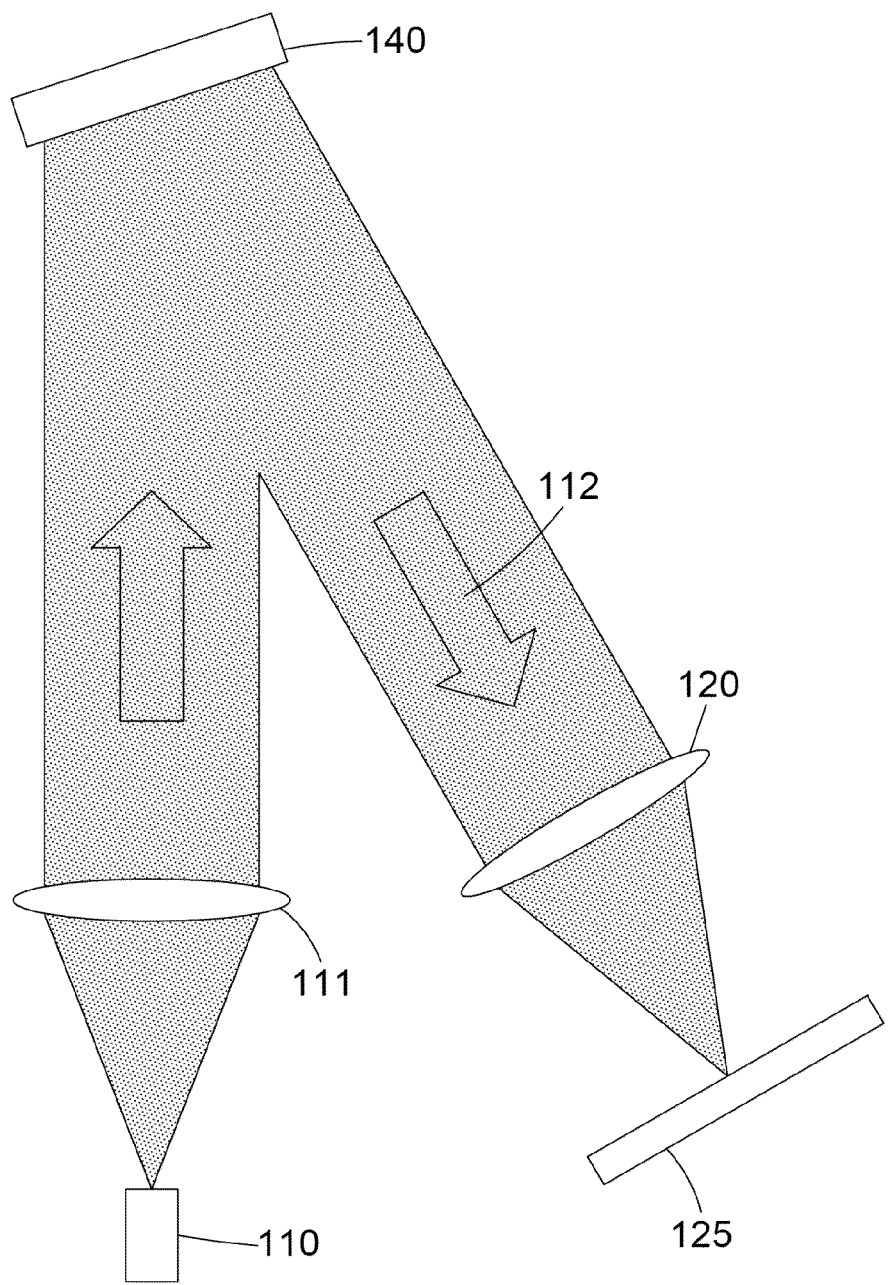
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
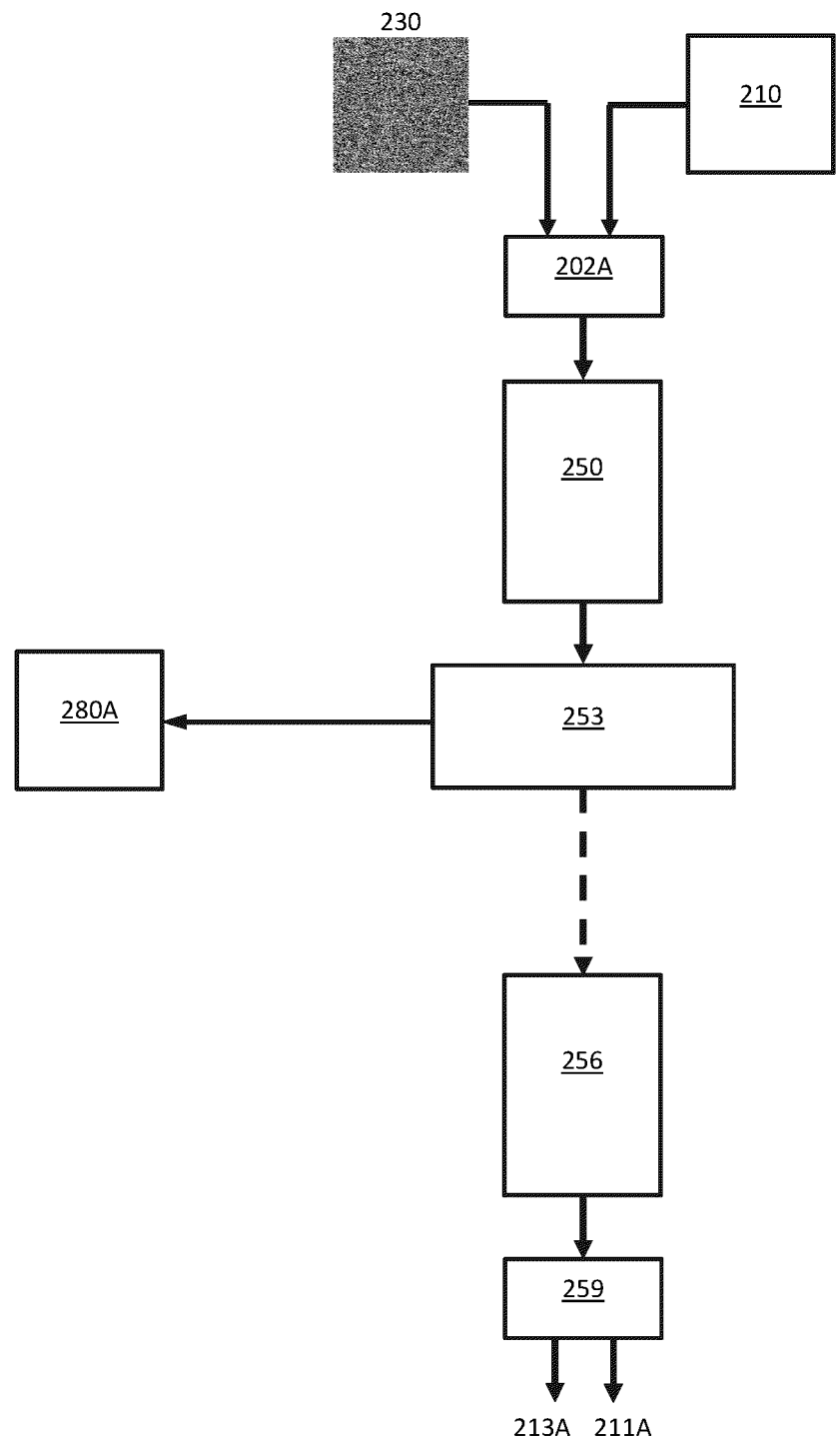
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
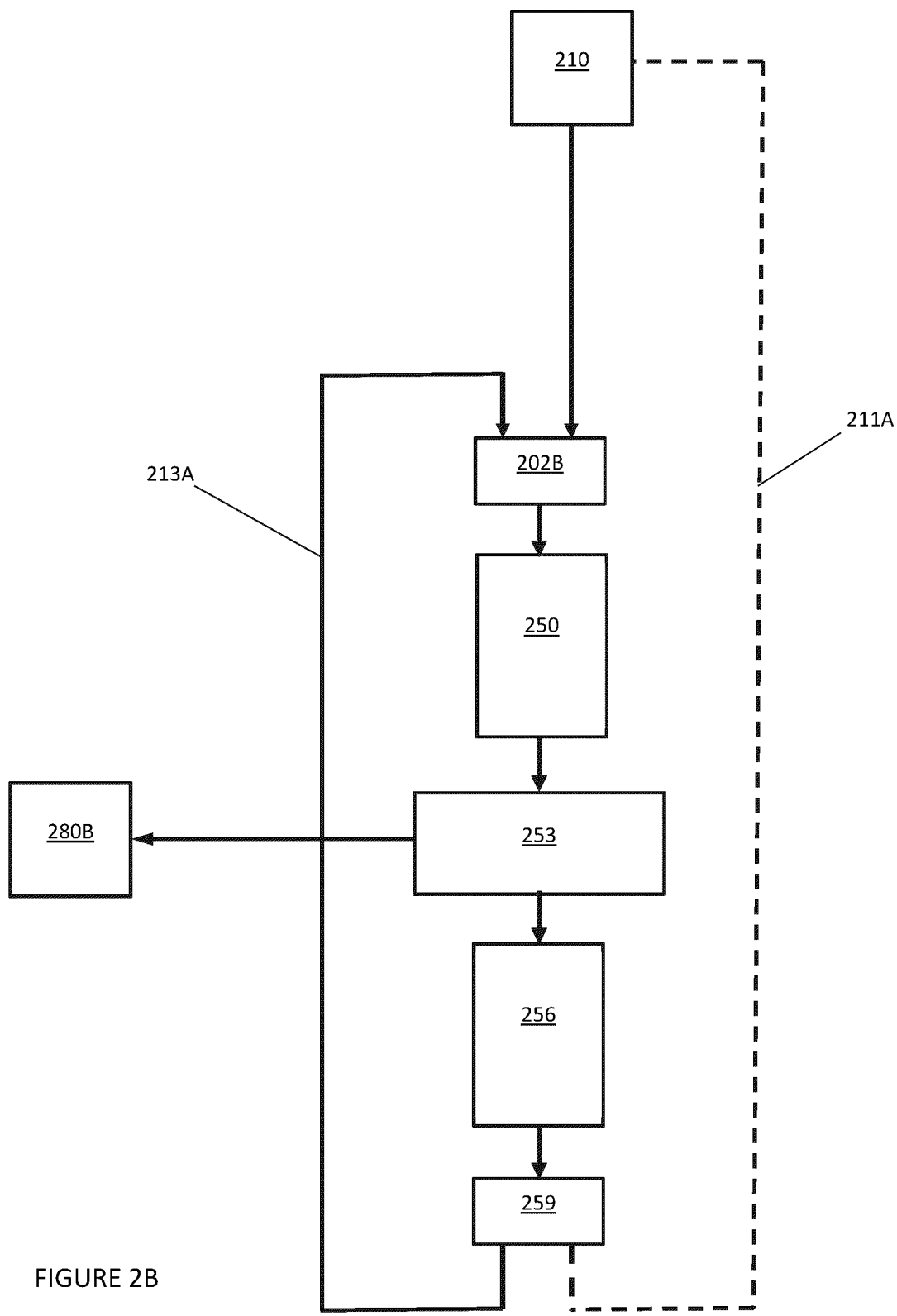
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
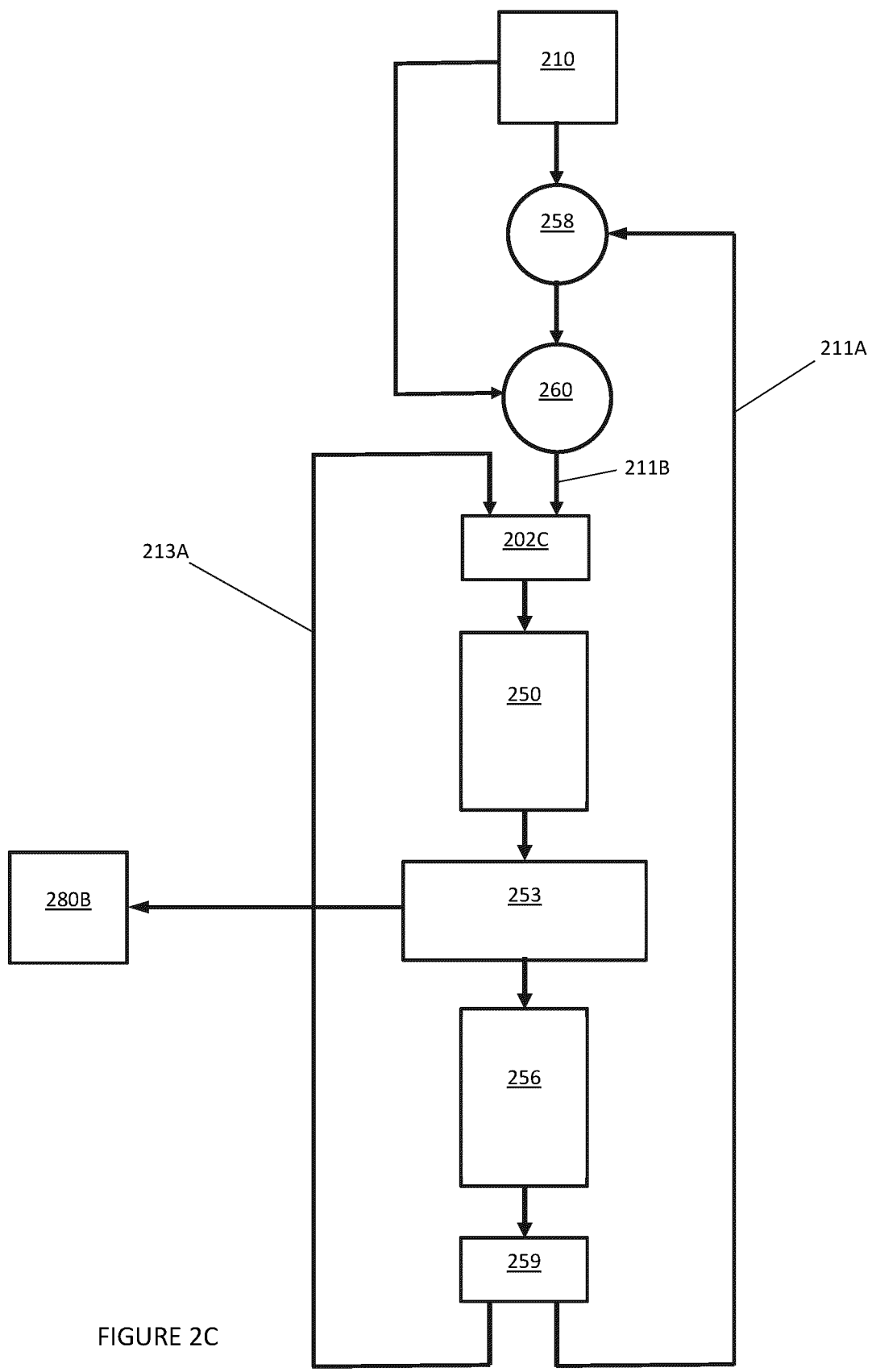
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta\cdot\exp(i\angle R_n[x,y])\}$$

$$\eta=T[x,y]-\alpha(|R_n[x,y]|-T[x,y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

A hologram calculator, such as a hologram engine, may be arranged to calculate each hologram. The hologram may be a computer-generated hologram retrieved from memory containing a plurality of holograms or the hologram may be calculated from a target image during operation such as real-time processing of a video stream of images. The hologram may be computer-generated using an iterative phase retrieval algorithm which may be based on the Gerchberg-Saxton algorithm, as described above. The iterative process, including forward and reverse Fourier transforms, results in substantially even use of the available/allowable grey levels. The hologram calculation process may include at least one forward Fourier transform and at least one reverse Fourier transform. The number of iterations of the algorithm may be greater than three. The hologram is therefore a phase hologram which means that each grey level comprises a phase delay value. The number of grey (e.g. phase) levels may be 2n, where n is an integer, optionally, greater than three.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
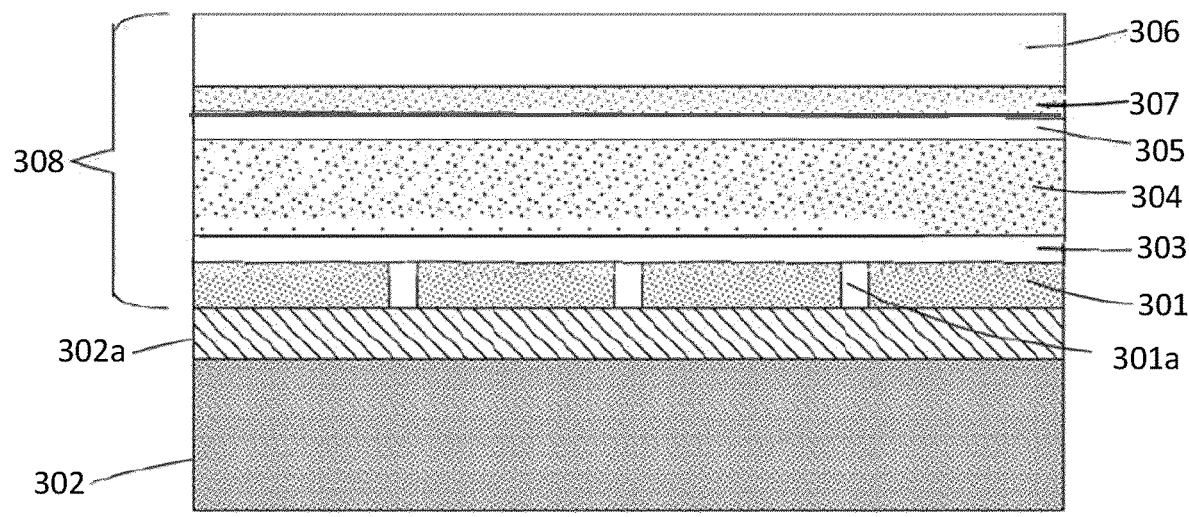
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs. It is known in the art how to calibrate a liquid crystal display device, such as the described LCOS SLM, to provide a plurality of quantised phase levels corresponding to the allowable modulation levels/grey levels, as described above. In particular, a calibration process is used to determine the control voltages to be applied to each (pixel) electrode 301 with respect to the (common) transparent electrode 307 to achieve each allowable phase level.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Driving a Liquid Crystal Display Device

In the field of liquid crystal displays, it is well-understood that "field inversion" is key to preserving the performance characteristics of a liquid crystal cell. In particular, it is commonplace to repeatedly reverse the polarity of the voltage applied to the liquid crystal cell so as to repeatedly reverse (i.e. invert) the direction of the electric field. For example, the voltage between the common electrode and the pixel electrode may be positive in a first frame and negative in a second frame. The equal but opposite electric field in the two frames results in the same grey level but ensures that the liquid crystal molecules are "DC balanced" and do not "stick". In this example, the same image is displayed twice: once using a positive electric field and once using a negative electric field. The number of times the image is displayed using a positive field should be equal to the number of times the image is displayed using a negative field to achieve DC balancing. There is significant prejudice in the art to deviating from this rule.

Each pixel of a liquid crystal display device may be a Freedericks cell comprising nematic liquid crystal. In other words, each pixel may comprise nematic liquid crystal arranged to perform a Freedericksz transition in response to the drive signal. The liquid crystal molecules are arranged to transition from a planar state to a homeotropic state when a voltage (i.e. potential difference) is applied across the cell. The voltage may be positive or negative. The liquid crystal molecules respond to the positive or negative voltage in the same way. Hence, field inversion can be achieved by simply reversing the voltage. A number of ways of achieving this are known using the common electrode voltage, $V_{COM}$. The drive signal comprises a voltage difference for each pixel, wherein the voltage difference is the respective pixel electrode voltage ($V_{PIXEL}$) minus the common electrode voltage ($V_{COM}$). If the drive signal is positive, each voltage difference is positive resulting in a positive electric field. If the drive voltage is negative, each voltage difference is negative resulting in a negative electric field.

As noted above, a "drive event" corresponds to the shortest time window in which a pixel voltage can be written to all (addressable) pixels of the display device for displaying a light modulation distribution comprising a particular hologram. The duration of the drive event is less than the frame rate needed to display video (i.e. a sequence of images at video frame rate). Each liquid crystal pixel of the display device may therefore be driven multiple times during display of the same image frame. Each image frame of a sequence of image frames making up a video may be divided into a plurality of sub-frames, wherein each sub-frame relates to a different representation of the same image frame. In accordance with this disclosure, the drive events of each frame are grouped into sub-frames. Each sub-frame is effectively written to the pixels a plurality of times during the sub-frame period in accordance with each drive event of the sub-frame. Each sub-frame may be DC balanced by providing an equal number of positive and negative field drive events during the sub-frame. In some embodiments, the field polarity of the drive events is continually reversed in order to achieved DC balancing of a sub-frame. In some embodiments, each sub-frame comprises an even number of drive events. Each drive event may have an equal and opposite with the sub-frame.

DC Balancing

Figure 4:
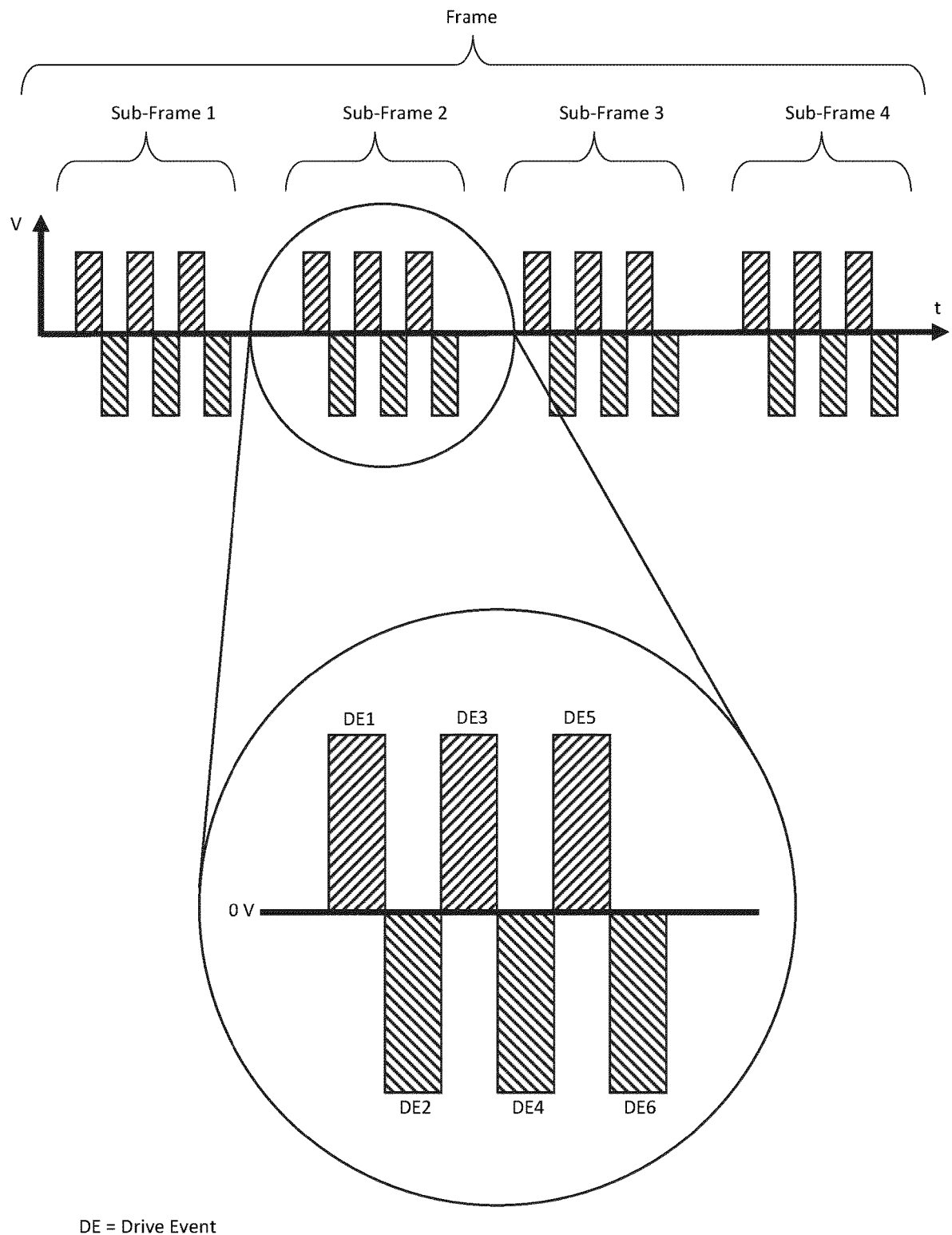
FIG. 4 shows an example scheme for driving a display device to display a hologram with DC balancing.

FIG. 4 illustrates a scheme for driving the pixel array of a liquid crystal display device to display an image, hologram or frame in order to illustrate the process of DC balancing. The x-axis is time and the y-axis is the potential difference across the liquid crystal—that is, the potential difference between the common electrode and pixel electrode. The potential difference may be positive (represented herein by voltages above the x-axis) or negative (represented herein by voltages below the x-axis). There are shown four sub-frames, wherein each sub-frame comprises six drive events. Each sub-frame corresponds to one representation of an image of a sequence of images for display (e.g. projection by a holographic projector). The sequence of images may be a video rate sequence of images forming a moving image. Each hatched rectangle of FIG. 4 represents a drive event. Each drive (or display) event comprises displaying a pattern on the pixels on the display device. Each display event therefore comprises applying an individual pixel voltage to each pixel of the display device. Each pixel voltage determines the local behaviour—e.g. orientation—of the liquid crystal. Since the liquid crystal is birefringent, each pixel voltage corresponds to a light modulation value such as a phase modulation value. A larger time gap between sub-frames than between display events of the same sub-frame is shown in FIG. 4 for illustration only. In practice, the time gap between display events may be even.

Figure 5A:
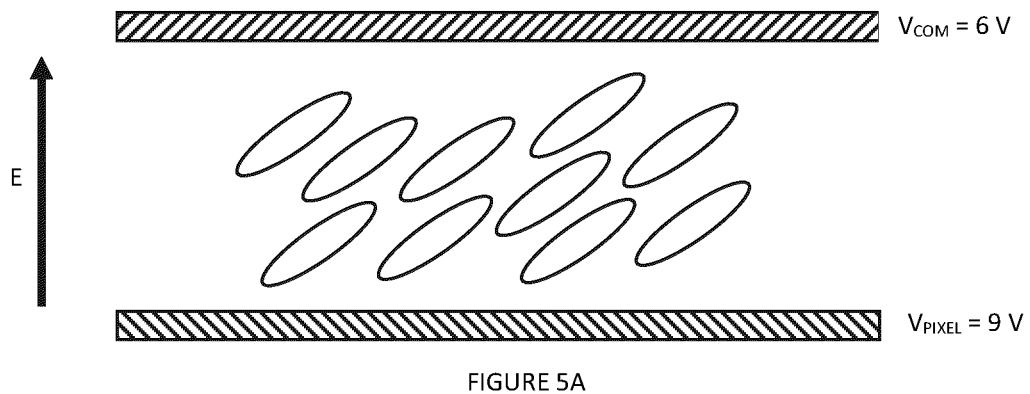
FIG. 5A-C show example drive voltages applied to the pixel and common electrodes of a liquid crystal cell to provide respective positive and negative electric fields in a scheme for DC balancing.
Figure 5B:
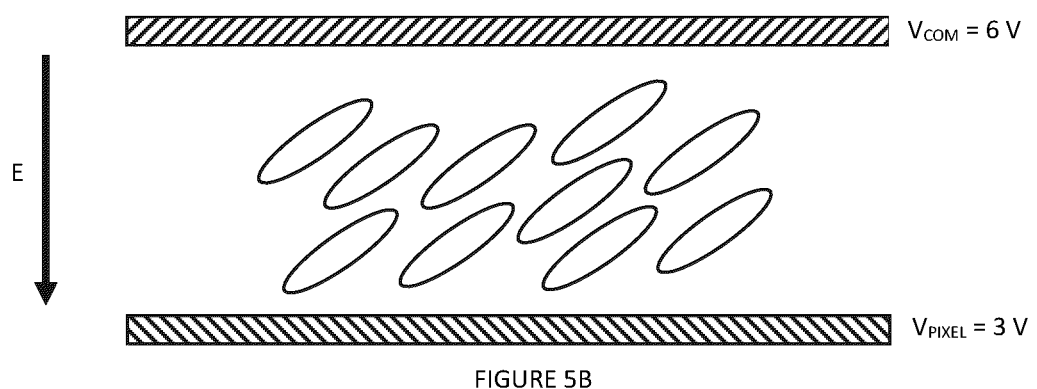

In this example, each sub-frame comprises six display events. Each display event of a sub-frame corresponds to the same pattern for display (e.g. projection by a holographic projector). In effect, the same pattern is displayed six times within a sub-frame interval. It may be said that the pixels of the display device are refreshed five times per sub-frame to form a total of six display events per pattern (or per sub-frame). It will be noted that the polarity of the potential difference is alternating within each display event. In this example, each sub-frame comprises three display events using a positive potential difference interleaved with three display events using a negative potential difference. The concept of using either a positive potential difference or a negative potential difference to display each pattern is described further below with reference to FIG. 5. For the avoidance of doubt, the polarity of the potential difference applied across each pixel of the pixel array during a display event is the same. That is, during a drive event, all (addressable) pixels are either subjected to a positive potential difference or all (addressable) pixels are subjected to a negative potential difference. The words positive and negative are principally used herein to reflect the direction of the potential difference is reversed. As the skilled person will appreciate, it is not essential that the polarity of the potential difference—and therefore the electric field—is continually reversed for successive drive events to achieve DC balancing of the liquid crystals. For example, each sub-frame may comprise three positive field drive events in succession followed by three negative field display events in succession. The key principle accepted in the technical field is that the number of positive field display events in each frame must be equal to the number of negative field display events in each frame—regardless of the order of the positive and negative field display events in the sub-frame or frame. This ensures so-called DC balancing and prevents the liquid crystals from sticking. Each image can be displayed using a positive electric field or a negative electric field. Image pixel values (e.g. light modulation values) are converted to pixel voltages in accordance with a scheme previously determined by calibration, as discussed above and known in the art. Each light modulation value may be achieved by applying a positive voltage or negative voltage to a pixel. In other words, a particular liquid crystal orientation (i.e. light modulation value) may be achieved using a positive field (FIG. 5A) or a negative field (FIG. 5B). FIGS. 5A and 5B show the common electrode voltage, $V_{COM}$, and pixel electrode voltage, $V_{PIXEL}$. The direction of the potential difference between the common electrode and pixel electrode determines the direction of the electric field across the liquid crystal as represented by the arrow labelled E. The liquid crystal director responds to the electric field but it is the magnitude of the electric field determines the orientation of the liquid crystal director, not the polarity. Since the magnitude of the potential difference using the positive and negative fields is the same (i.e. 3V), the response (i.e. orientation) of the liquid crystal molecules in the layer between the common and pixel electrodes is the same, as shown in FIGS. 5A and 5B.

Figure 5C:

FIG. 5C shows a common electrode voltage of 6V. If pixel voltages between 6V and 12V are used to represent the pattern, a positive field is induced in the liquid crystal. If pixel voltages between 0V and 6V are used to represent the pattern, a negative field is induced in the liquid crystal. FIG. 5 illustrate how the same light modulation level (i.e. the same liquid crystal response/orientation) may be achieved using a positive electric field or a negative electric field. Any number of techniques are known in the art for manipulating the pixel voltages and/or common voltage in order to provide positive and negative field display events—some of these methods involve using a fixed $V_{COM}$ (as per FIGS. 5A and 5B in which $V_{COM}$ is 6V in the positive field case and the negative field case) and other methods involve using a variable $V_{COM}$. The method chosen to provide complementary positive fields and negative fields is not important in the context of the present disclosure.

Driving Scheme with Variable Sub-Frame Rate

Some embodiments relate to a so-called "ramped pixel driver scheme" in which the voltage across each pixel is ramped-up over time until the desired grey level is achieved. During the so-called "ramping period", the gate of the pixel (transistor) is opened, charge is driven to the pixel for a number of clock pulses that corresponds to the grey level. The ramping period ends when the gate is closed; however, the charge applied during the ramping period is maintained on the pixel. Conventional schemes for driving a liquid crystal display device to display a hologram comprise drive events of fixed duration, which is dependent upon the number of clock pulses required to achieve the maximum grey level. Therefore, in a ramped pixel driver scheme, each pixel is addressed for a fixed duration (herein "addressing period") corresponding to a maximum number of clock pulses, such that at the end of the ramping period the clock pulses may continue on to the maximum value even though the gate may be closed. Typically, all the pixels in a line in the image (or pixel array) are addressed in parallel and so share a common addressing period. However, each pixel in a line has its own ramping period that is less than or equal to the addressing period (i.e. the gate of each pixel in the line may be closed at a different time) dependent upon the desired grey level to be written thereto. The total number of clock pulses corresponding to the maximum value defines the so-called "line time"—that is, the time taken to drive all (addressable) pixels of a line. Generally, the duration of a drive event for a subframe is the line time multiplied by the number of lines in the image. In the present disclosure, the number of clock pulses required to achieve the maximum grey level (i.e. maximum pixel voltage) using a ramped pixel driver scheme is referred to as a "maximum number of clock pulses for pixel driving" or simply "maximum number of clock pulses".

FIG. 6A shows a scheme for driving a liquid crystal display device to display a hologram according to a first comparative example. In particular, the scheme comprises a time sequence of six consecutive display events (corresponding to a full frame), where each display event writes values to all the pixels of the display device (corresponding to a subframe). In this example, the six display events continually alternate between positive and negative field display events of the same hologram for DC balancing, as described above. In particular, first display event 610a, third display event 610b and fifth display event 610c in the sequence each apply a positive potential difference between the pixel and common electrodes to provide a positive field, as described above in relation to FIG. 5A. Second display event 620a, fourth display event 620b and sixth display event 620c in the sequence each apply a negative potential difference between the pixel and common electrodes to provide a negative field, as described above in relation to FIG. 5B. Each display event (subframe) has the same duration, which is dependent upon a defined maximum number of clock pulses required to achieve the maximum allowable grey level, as described above. An illumination event 600, in which the display device is illuminated with light to form a holographic reconstruction of the displayed hologram, starts at the end of a time interval t after the completion of the first display event 610a to display the hologram. The time interval t is predetermined based on the response-time of the liquid crystal.

In particular, the time interval, t, represents the time taken for the liquid crystal to correctly orientated in accordance with the desired grey level. The time interval, t, is measured from the end of the first sub-frame—because this is the first instance in time when all (addressable) pixels of the display device have been written with the hologram/subframe data. Thus, the time interval t enables the last pixel to be written during the first display event 610a to respond and correctly orientate in accordance with the applied pixel value (i.e. pixel voltage/grey level).

FIG. 6B shows another scheme for driving a liquid crystal display device to display a hologram according to a second comparative example. In particular, the scheme comprises a time sequence of two consecutive display events (corresponding to a full frame), where each display event writes values to all the pixels of the display device (corresponding to a subframe). The display events comprise a positive display event and a negative display event for DC balancing, as described above. In particular, a first display event 630a may be a positive display event of a hologram as illustrated in FIG. 5A and a second display event 640a may be a negative display event of the (same) hologram as illustrated in FIG. 5B. Each display event (subframe) has the same duration, which is dependent upon a maximum number of clock pulses, as described above. The illumination event 600 starts at the end of a time interval t after the completion of the first display event 630a to display the hologram. In the second comparative example of FIG. 6B, the maximum number of clock pulses is greater than the maximum number of clock pulses in the first comparative example of FIG. 6A. Thus, the duration of each display event in FIG. 6B is longer that the duration of each display event in FIG. 6A. However, in the second comparative example of FIG. 6B, the time interval t is the same as in the example of FIG. 6A because the time interval, t, is a function of the liquid crystal not the drive scheme.

As described above, each display event 630a, 640a in the second comparative example of FIG. 6B has a longer duration that each display event 610-c, 620a-c in the first comparative example of FIG. 6A. This enables the maximum number of clock pulses to be increased. The longer sub-frame interval/display event enables a higher-bit representation of the pixels voltage values to be written to all of the pixels of the display device. Thus, more refined pixel voltage values, corresponding to grey levels, can be written to the display device resulting in higher resolution images.

Figure 6C:
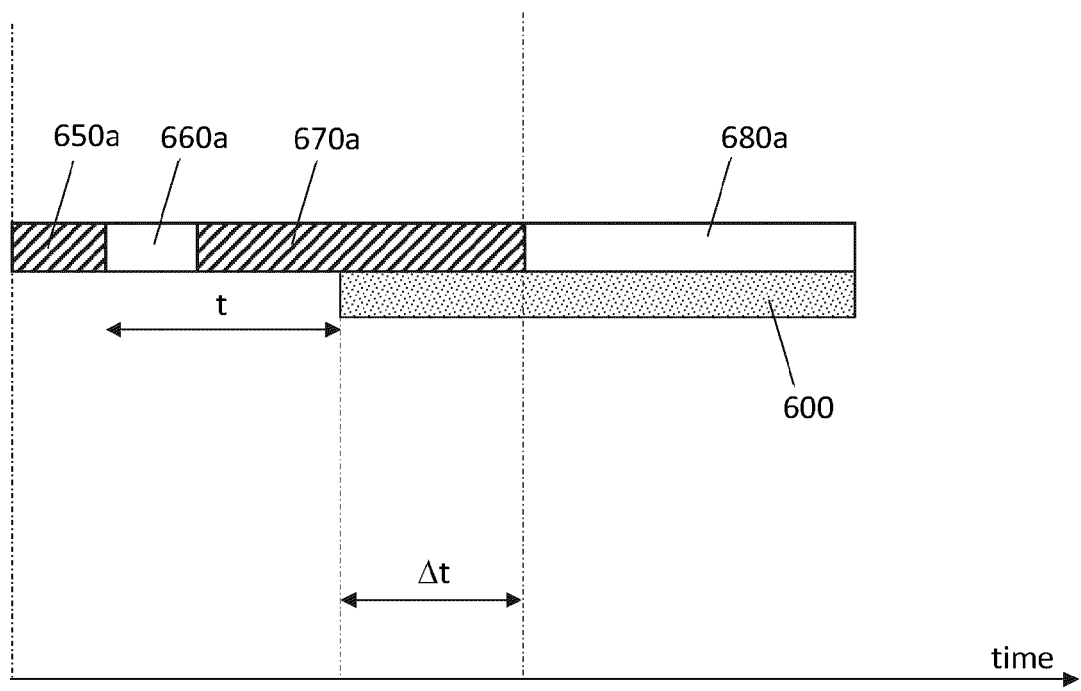
FIG. 6C shows an example scheme for driving a display device to display a hologram frame in accordance with an embodiment.

FIG. 6C shows an example scheme for driving a liquid crystal display device to display a hologram in accordance with an embodiment of the present disclosure. In particular, the scheme comprises a time sequence of four consecutive display events (corresponding to a full frame), where each display event writes values to all the pixels of the display device (corresponding to a subframe). In the illustrated example, the display events include an equal number of positive and negative field display events of the same hologram for DC balancing, as described above. In particular, first display event 650a and third display event 670a in the sequence may be positive display events as illustrated in FIG. 5A and second display event 660a and fourth display event 680a may be negative display events as illustrated in FIG. 5B. In contrast to the schemes of the first and second comparative examples described above, the display events (subframes) may have a variable duration. Pairs of positive and negative display events (subframes) should ideally have the same duration for DC balancing. In the scheme of FIG. 6C, each of the first display event 650a and the second display event 660a has a first duration, which is dependent upon a first maximum number of clock pulses for pixel driving. Each of the third display event 670a and the fourth display event 680a has a second duration, which is dependent upon a second maximum number of clock pulses for pixel driving. The first duration of the first and second display events 650a, 660a is less than the second duration of the third and fourth display events 670a, 680a. Thus, the first maximum number of clock pulses for pixel driving is less than the second maximum number of clock pulses for pixel driving. In the illustrated example, the first maximum number of clock pulses corresponds to the maximum number of clock pulses used in the drive events of the first comparative example of FIG. 6A, and the second maximum number of clock pulses corresponds to the maximum number of clock pulses used in the longer duration drive events of the second comparative example of FIG. 6B. The illumination event 600 starts at the end of a time interval t after the completion of the first display event 650a to display the hologram. In the scheme shown in FIG. 6C, the time interval t is the same as in the examples of FIGS. 6A and 6B.

In accordance with the embodiment of FIG. 6C, the maximum number of clock pulses for pixel driving for drive events is varied, whilst maintaining the same clock rate. Thus, in contrast to the conventional wisdom, drive events (sub-frames) may have different durations within a frame interval (full frame), and, in consequence, the time taken to write a sub-frame to a display device is variable. This is because, in accordance with this disclosure, the resolution of the pixel voltage values (e.g. bit-level representations) written to the pixels of the display device is varied. This leads to a number of advantages, as described further in the following.

In particular, in the scheme of the embodiments of FIG. 6C, the duration of each of the first pair of (DC balanced) drive events 650a, 660a (subframes) is reduced. This can be achieved, for example, by writing pixel voltage values with a reduced number of bits or a "reduced bit-depth" (i.e. reduced precision/resolution pixel voltage value). For example, the calculated pixel values may have n bits (i.e. n-bit representation) and the pixel values may be reduced to have m bits (i.e. m-bit representation) by removing bits such as removing the two least significant bits. By reducing the duration of the first drive event 650a, the hologram is written to the pixels of the display device more quickly, and the inventors have found that the liquid crystal reaches a steady state sooner within the frame interval. This leads to faster and more stable hologram display. Moreover, each drive event corresponds to a subframe of a frame to display a hologram. By including shorter duration first drive events 650a, 660a, a greater number of subframes can be displayed during a frame interval to display the hologram. A number of advantages are associated with increasing the number of subframes per frame. In particular, the inventors have found that image quality can be improved by displaying the hologram differently in different subframes, for example by changing the tiling scheme used to display the hologram as described below.

Accordingly, increasing the total number of subframes per frame enables a greater number of different subframes and subframe formats to be displayed during the frame interval so as to improve image quality. In addition, since the pixel ramping period/addressing period is faster during the m-bit subframes, the illumination event 600 can commence earlier in the frame interval and may have a longer duration.

As described above in relation to FIG. 6A, reducing the duration of drive events reduces the maximum number of clock pulses for pixel driving. In accordance with this disclosure, reduced/shallower bit representations of the pixel voltage values may be written during the first and second drive events 650*a*, 660*a*. On its own, this would lead to reduced resolution/image quality. However, in accordance with the present disclosure, further drive events are provided and the bit depth is increased for these further drive events. The duration of the drive events is therefore variable during the frame interval. Thus, in the illustrated embodiment, the duration of the subsequent drive events is increased to allow for a larger maximum number of clock pulses for pixel driving. Thus, higher/deeper bit representations of the pixel voltage values may be written during the third and fourth drive events 670*a*, 680*a*. Thus, high resolution pixel values are written to the display device during at least part of the frame interval, so that the resolution of the holographic reconstruction is not compromised.

Example schemes for driving a liquid crystal display device to display a hologram in accordance with embodiments, such as the example scheme of FIG. 6C, may be implemented in a number of ways. In one implementation, the driving scheme may be implemented using drive circuitry having two or more modes or operation. In particular, the drive circuitry may have at least a first, low bit-depth mode for driving the pixels with a reduced/shallower bit representation of the pixel values (e.g. with the least significant bits removed) and a second, high bit-depth mode for driving the pixels with a higher bit representation of the pixel values (e.g. as calculated by the hologram calculation algorithm). The drive circuitry may be integrated within the display device (e.g. LCOS) or may be external (e.g. part of a combined controller/driver of the display device).

In the low bit-depth mode, the drive circuitry may operate by providing a relatively high drive current in order to achieve the (maximum) pixel voltage in a shorter addressing period. The shorter addressing period corresponds to the maximum number of clock pulses for pixel driving with the pixel values having the reduced number of bits (e.g. m bits). Accordingly, in the low bit-depth mode, the line time is low because all pixels in a row are written in a shorter common addressing period. Thus, the drive event (comprising the sum of the line times for all the lines of pixels) is quicker. The low bit-depth mode may be used for the first and second drive events 650*a*, 660*a* of the example scheme of FIG. 6C. In the high bit-depth mode, the drive circuitry my operate by providing a relatively low drive current because the (maximum) pixel voltage is achieved in a longer addressing period. The longer addressing period corresponds to the maximum number of clock pulses for the pixel driving with the pixel values having the higher number of bits (i.e. n bits). Accordingly, in the high bit-depth mode, it takes more time to charge to the (maximum) pixel voltage, meaning the (common) addressing period/line time is relatively high and so the drive event is slower. The high bit-depth mode may be used for the third and fourth drive events 670*a*, 680*a* of the example scheme of FIG. 6C.

Thus, in the above described implementation, the mode of operation of the drive circuitry determines (1) the drive current (which determines how quickly the pixels are charged) and (2) the line time or (common) addressing period (i.e. the number of clock pulses that are counted before moving onto the next row of pixels). The switching between modes is defined by the driving scheme, which may be the same for all frames. In this case, the switching between modes is periodic and predictable, so that the drive circuitry itself may control switching between modes simply by counting clock pulses. Alternatively, the mode of operation may be indicated (e.g. by an indicator such as a flag) in a subframe comprising the pixel values to be written during a respective drive event. In this case, the switching may be performed by the drive circuitry when a next subframe has a different mode indicator than the preceding subframe.

Accordingly, there is provided a method of driving a liquid crystal display device to display a hologram. A grey level value for each pixel of a hologram is received. A pixel voltage based on the grey level for each pixel of the hologram is determined. The pixels of an array of pixels of a liquid crystal display device are driven in accordance with a first representation of the pixel voltages during at least one first drive event. The pixels of the array of pixels of the display device are driven in accordance a second representation of the pixel voltages during at least one second drive event, after the at least one first drive event. The first representation is an n-bit representation and the second representation is a m-bit representation and n<m.

There is also provided a method of driving a liquid crystal display device to display a hologram. A grey level value for each pixel of a hologram is received. A pixel voltage based on the grey level for each pixel of the hologram is determined. The pixels of an array of pixels of a liquid crystal display device are driven for at least one first drive event having a first duration. The pixels of the array of pixels of the display device are driven in accordance a second representation of the pixel voltages during at least one second drive event having a second duration. The at least one second drive event is after the at least one first drive event. The second duration is greater than the first duration.

In the scheme of the embodiment shown in FIG. 6C, a method comprising a sequence of four display events, having two pairs of "DC balanced" drive events, is proposed. In other embodiments, a sequence comprising any other even number of DC balanced display events can be used, in which the first pair of display events has a shorter duration than at least one subsequent pair of display events. In addition, embodiments comprising a sequence of display events with odd numbers of display events of variable duration are possible and contemplated, with or without compensation for DC balancing, as described herein.

Block Diagram

Figure 7:
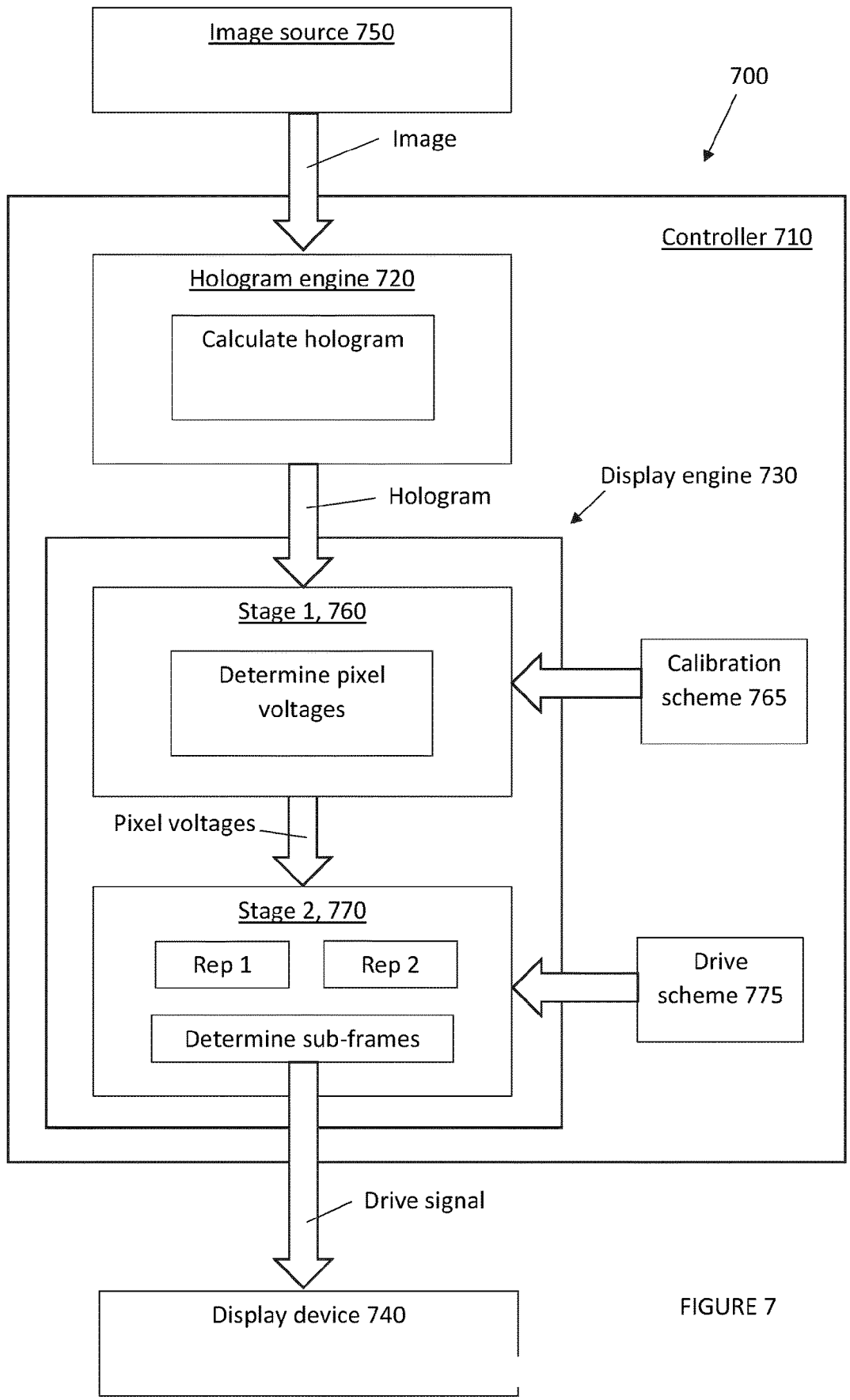
FIG. 7 is a schematic block diagram showing a holographic projection system in accordance with embodiments.

FIG. 7 shows a holographic projection system 700 in accordance with embodiments. In particular, the system comprises a liquid crystal display device 740 and a controller 710 arranged to drive the display device 740 to display a hologram using a driving scheme in accordance with the present disclosure. Liquid crystal display device 740 may comprise a spatial light modulator, such as a LCOS SLM, as described herein.

Generally, controller 710 comprises a hologram engine 720 and a display engine 730. Hologram engine 720 is arranged to determine a hologram for an input image, and provide the hologram to display engine 730. For example, hologram engine 720 may calculate a computer-generated hologram using an algorithm as described herein. In the illustrated system 700, hologram engine 720 receives an image from an image source 750, such as a camera, and calculates a corresponding hologram. In some implementations, the image source 750 may provide a sequence of images for display at video frame rate and the hologram engine 720 may calculate a sequence of corresponding holograms, which are provided, in sequence, to display engine 730.

Display engine 730 receives a hologram from hologram engine 720 and generates a drive signal for driving display device 740 to display the hologram in accordance with the present disclosure. Thus, display engine 730 may be considered to operate as a display driver. Display engine 730 comprises a first stage 760 and a second stage 770. In the first stage 760, display engine 730 determines pixel voltages based on the grey levels (e.g. phase modulation levels) of the received hologram. In particular, first stage 760 determines the pixel voltages corresponding to the grey levels based on a predetermined calibration scheme 765 for the display device 740. The calibration scheme 765 may comprise a look-up table stored in the controller 710 that provides a mapping between grey levels and pixel voltages, or may comprise a predetermined formula for calculation of the pixels voltages from grey levels, based on prior calibration of the system 700. First stage 760 determines the pixel voltages with a high level of precision, i.e. a high number of bits. Second stage 770 generates a drive signal for a plurality of display events (sub-frames) on the display device 740 in accordance with a driving scheme 775. The driving scheme 775 may be stored in controller 710, and may be determined according to design requirements. In accordance with the present disclosure, driving scheme 775 comprises at least one drive event (subframe) in accordance with a first representation of the pixel voltages followed by at least one second drive event (subframe) in accordance with a second representation of the pixel voltages, wherein the first representation has a lower bit-depth than the second representation. It may be said that the at least one drive event (subframe) of the driving scheme 775 has a first duration and the at least one second drive event (subframe) of the driving scheme 775 has a second duration, wherein the first duration is shorter than the second duration. Accordingly, second stage 770 of display engine 730 may determine first representation Rep 1 and second representations Rep 2 of the pixel voltages received from first stage 760, and determine subframes in accordance with the driving scheme 775. In particular, second stage 770 may generate a drive signal for a sequence of drive events comprising at least one drive event (subframe) in accordance with the first representation Rep 1 of the pixel voltages followed by at least one second drive event (subframe) in accordance with the second representation Rep 2 of the pixel voltages. In some implementations, the sequence of drive events may comprise one or more "DC balanced" pairs of first drive events followed by one or more "DC balanced" pairs of second drive events, as described herein. As the skilled person will appreciate, each subframe for display on display device 740 may be determined by display engine 730 using conventional techniques according to design requirements, including tiling techniques for optimising image quality as described below.

As described above, drive circuitry (not shown) associated with the display device may receive the drive signal from second stage 770 of display engine 730, and drive the pixels of the display device with the respective pixels values for each drive event in sequence, The drive circuitry may switch between modes of operation for drive events in the sequence in accordance with driving scheme 775, for example by counting clock pulses, based on an indicator associated with a subframe/drive event or otherwise.

ADDITIONAL FEATURES

In some embodiments, the light source is a laser such as a laser diode. In some embodiments, the light receiving surface is a diffuser surface or screen such as a diffuser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affected by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focussed at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the hologram is smaller than the spatial light modulator. More specifically, the number of hologram pixels is less than the number of light-modulating pixels available on the spatial light modulator. In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator. In some embodiments, the technique of "tiling" is implemented to increase image quality. Specifically, some embodiments implement the technique of tiling to minimise the size of the image pixels whilst maximising the amount of signal content going into the holographic reconstruction. In some embodiments, the holographic pattern written to the spatial light modulator comprises at least one whole tile (that is, the complete hologram) and at least one fraction of a tile (that is, a continuous subset of pixels of the hologram).

In embodiments, only the primary replay field is utilised and system comprises physical blocks, such as baffles, arranged to restrict the propagation of the higher order replay fields through the system.

In embodiments, the holographic reconstruction is colour. In some embodiments, an approach known as spatially-separated colours, "SSC", is used to provide colour holographic reconstruction. In other embodiments, an approach known as frame sequential colour, "FSC", is used.

The method of SSC uses three spatially-separated arrays of light-modulating pixels for the three single-colour holograms. Thus, a drive event, as described herein, comprises driving all the (addressable) pixels of one of the three arrays of pixels to display a particular single-colour hologram. In the SSC method, three drive events may be performed concurrently to drive respective ones of the three arrays of pixels so as to display the three single-colour holograms at substantially the same time. An advantage of the SSC method is that the image can be very bright because all three holographic reconstructions may be formed at the same time. However, if due to space limitations, the three spatially-separated arrays of light-modulating pixels are provided on a common SLM, the quality of each single-colour image is sub-optimal because only a subset of the available light-modulating pixels is used for each colour. Accordingly, a relatively low-resolution colour image is provided.

The method of FSC can use all pixels of a common spatial light modulator to display the three single-colour holograms in sequence. The single-colour reconstructions are cycled (e.g. red, green, blue, red, green, blue, etc.) fast enough such that a human viewer perceives a polychromatic image from integration of the three single-colour images. An advantage of FSC is that the whole SLM is used for each colour. This means that the quality of the three colour images produced is optimal because all pixels of the SLM are used for each of the colour images. However, a disadvantage of the FSC method is that the brightness of the composite colour image is lower than with the SSC method—by a factor of about 3—because each single-colour illumination event can only occur for one third of the frame time. This drawback could potentially be addressed by overdriving the lasers, or by using more powerful lasers, but this requires more power resulting in higher costs and an increase in the size of the system.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A method of driving a liquid crystal display device to display a hologram, the method comprising:
    receiving a grey level value for each pixel of a hologram;
    determining a pixel voltage based on the grey level value for each pixel of the hologram;
    driving the pixels of an array of pixels of a liquid crystal display device in accordance with a first representation of the pixel voltages during at least one first drive event and driving the pixels of the array of pixels of the display device in accordance with a second representation of the pixel voltages different from the first representation during at least one second drive event after the at least one first drive event, wherein the at least one first drive event is shorter in duration than the at least one second drive event.

2. The method as claimed in claim 1 wherein the first representation is an n-bit representation and the second representation is a m-bit representation and n<m.

3. The method as claimed in claim 1 further comprising beginning illumination of the pixels of the display device after the at least one first drive event in order to form a holographic reconstruction corresponding to the hologram on a replay plane.

4. The method as claimed in claim 3 wherein illumination of the pixels of the display device is begun a predetermined time after a first drive event of the at last one first drive event.

5. The method as claimed in claim 1 wherein the at least one first drive event comprises at least one pair of complementary first drive events, wherein each pair of first drive events are DC balanced.

6. The method as claimed in claim 1 wherein the at least one second drive event comprises at least one pair of complementary second drive events, wherein each pair of second drive events are DC balanced.

7. The method as claimed claim 1 further comprising deriving the first representation from the second representation.

8. The method as claimed in claim 7 comprising removing one or more least significant bits of the second representation to derive the first representation.

9. The method as claimed in claim 1 comprising driving the pixels of the array of pixels of the liquid crystal display device using a ramped pixel driver scheme, in which each pixel is addressed for a ramping period, wherein the ramping period of the at least one first drive event is shorter in duration that the ramping period of the at least one second drive event.

10. A liquid crystal display device arranged to display a hologram, the display device comprising:
    a display driver arranged to receive a grey level value for each pixel of a hologram, and to determine a pixel voltage based on the grey level value for each pixel of the hologram;
    wherein the display driver is arranged to drive the pixels of an array of pixels of a liquid crystal display device to the determined pixel voltages in accordance with a driving scheme comprising at least one first drive event and at least one second drive event after the at least one first drive event, wherein each drive event writes pixel voltages to all the pixels of the array of pixels of the display device, wherein each first drive event is shorter in duration than each second drive event, and
    wherein the display driver is arranged to drive the pixels of the display device in accordance with a first representation of the pixel voltages during the at least one first drive event and to drive the pixels of the display device in accordance a second representation of the pixel voltages different from the first representation of the pixel voltages during the at least one second drive event.

11. The display device as claimed in claim 10 wherein the first representation is an n-bit representation and the second representation is a m-bit representation and n<m.

12. The display device as claimed in claim 11 wherein the display driver is further arranged to derive the first representation of the pixel voltages from the second representation of the pixel voltages.

13. The display device as claimed in claim 12 wherein the display driver is arranged to derive the first representation of the pixel voltages by removing one or more least significant bits of the second representation to derive the first representation.

14. The display device as claimed in claim 10 further comprising:
a hologram engine arranged to calculate a grey level value for each pixel of a hologram.

15. The display device as claimed in claim 10, comprising a pixelated spatial light modulator ("SLM").

16. The display device as claimed in claim 15, wherein the pixelated spatial light modulator is an LCOS SLM.

17. The display device as claimed in claim 9 wherein the display driver is arranged to drive the pixels of the array of pixels of a liquid crystal display device using a ramped pixel driver scheme, in which each pixel is addressed for a ramping period, wherein the ramping period of the at least one first drive event is shorter in duration that the ramping period of the at least one second drive event.

18. A head-up display or a head-mounted display comprising the display device of claim 10.

19. The method as claimed in claim 1, wherein in the first representation the pixel voltages are represented by a first number of bits, and in the second representation the pixel voltages are represented by a second number of bits different from the first number of bits.

20. The display device as claimed in claim 10, wherein in the first representation the pixel voltages are represented by a first number of bits, and in the second representation the pixel voltages are represented by a second number of bits different from the first number of bits.

* * * * *